US012654813B2

(12) United States Patent
PrÆest

(10) Patent No.: US 12,654,813 B2
(45) Date of Patent: Jun. 16, 2026

(54) LIFT AND METHOD FOR LIFTING EQUIPMENT MODULES

(71) Applicant: SH GROUP A/S, Svendborg (DK)

(72) Inventor: Lars PrÆest, Svendborg (DK)

(73) Assignee: SH GROUP A/S, Svendborg (DK)

( * ) Notice: Subject to any disclaimer, the term of this patent is extended or adjusted under 35 U.S.C. 154(b) by 401 days.

(21) Appl. No.: 18/028,916

(22) PCT Filed: Jun. 11, 2021

(86) PCT No.: PCT/EP2021/065793

§ 371 (c)(1),
(2) Date: Mar. 28, 2023

(87) PCT Pub. No.: WO2022/069087

PCT Pub. Date: Apr. 7, 2022

(65) Prior Publication Data

US 2024/0025515 A1 Jan. 25, 2024

(30) Foreign Application Priority Data

May 18, 2021 (DK) ............................ BA202100044

(51) Int. Cl.
*B63B 27/16* (2006.01)
*B63B 27/10* (2006.01)
(Continued)

(52) U.S. Cl.
CPC .............. *B63B 27/16* (2013.01); *B63B 27/10* (2013.01); *B63B 27/22* (2013.01); *B66F 7/10* (2013.01);
(Continued)

(58) Field of Classification Search
CPC ................................ B63B 27/16; B66F 9/186
See application file for complete search history.

(56) References Cited

U.S. PATENT DOCUMENTS 3,688,933 A * 9/1972 Rumell .................. B66F 9/186
414/608
3,712,492 A 1/1973 Comfort
(Continued)

FOREIGN PATENT DOCUMENTS

EP 1843940 B1 12/2014

OTHER PUBLICATIONS

PCT International Search Report and Written Opinion for PCT Application No. PCT/EP2021/065793 mailed Sep. 22, 2021 (4 pages).

(Continued)

*Primary Examiner* — Jonathan Snelting
(74) *Attorney, Agent, or Firm* — Merchant & Gould P.C.

(57) ABSTRACT

A lift and method for lifting equipment modules, and for providing for sideways loading equipment modules, or cargo containers, onto a mounting surface of a sea vessel, such as a ship or submarine. The lift comprises a frame for supporting the equipment modules or cargo containers, and includes a number of conveying beams for conveying the equipment module or cargo container in a sideways direction in relation to the frame, and means for lifting said conveying beams in a vertical direction. The method includes, providing a lift according to the invention; arranging an equipment module or cargo container onto the lift; maneuvering the lift on a ground surface into a position substantial parallel with the hull of said sea vessel; raising the equipment module or cargo container by the lift in a vertical direction to a specific vertical position in relation to a mission bay in said hull; conveying the equipment module or cargo container sideways into the mission bay, by said conveying beams; connecting the equipment module or cargo container to a number of anchoring points within the
(Continued)

mission bay and retracting the conveying beams out of the mission bay.

19 Claims, 14 Drawing Sheets

(51) Int. Cl.

| | |
|---|---|
| ***B63B 27/22*** | (2006.01) |
| ***B66F 7/10*** | (2006.01) |
| ***B66F 9/14*** | (2006.01) |
| ***B66F 9/18*** | (2006.01) |
| *B63B 19/08* | (2006.01) |

(52) U.S. Cl.
CPC ................ *B66F 9/14* (2013.01); *B66F 9/186* (2013.01); *B63B 19/08* (2013.01)

(56) References Cited

U.S. PATENT DOCUMENTS

| | | | | | |
|---|---|---|---|---|---|
| RE27,905 | E | * | 1/1974 | Whiteman | B66F 9/186 D12/205 |
| 3,785,515 | A | | 1/1974 | Shaffer | |
| 4,024,968 | A | | 5/1977 | Shaffer et al. | |
| 5,354,112 | A | * | 10/1994 | Hara | B66C 1/101 294/81.5 |
| 5,915,905 | A | * | 6/1999 | Hopland | B63B 27/16 414/137.4 |
| 9,177,210 | B2 | * | 11/2015 | King | B66F 9/0755 |

OTHER PUBLICATIONS

Written Opinion of the International Searching Authority for PCT Application No. PCT/EP2021/065793 mailed Jan. 21, 2022 (5 pages).

* cited by examiner

LIFT AND METHOD FOR LIFTING EQUIPMENT MODULES

This application is a National Stage Application of PCT/EP2021/065793, filed 11 Jun. 2021, which claims the benefit of U.S. Ser. No. 63/084,733, filed 29 Sep. 2020, and Application No. BA 2021 00044, filed on 18 May 2021 in Denmark, and which applications are incorporated herein by reference. To the extent appropriate, a claim of priority is made to each of the above disclosed applications.

TECHNICAL FIELD

The invention relates to the field of loading equipment modules onto a sea vessel. Specifically, the invention relates to the loading of equipment modules into the side or stern of a sea vessel, such as a ship.

BACKGROUND OF THE INVENTION

Sea vessels such as ships used for military or industrial purposes are expensive investments in procurement and also during operation.

Sea vessels are typically highly specialized for a specific operation task, such as military purpose, research programs, environment purposes, such as oil cleaning, offshore construction etc.

Such sea vessels are, however, rarely in operation for longer periods of time, and are therefore, compared to the operational hours, extremely expensive and have a slow return of investment.

It is thus desirable to be able to utilize such ships for multiple purposes by being able to exchange specific operation equipment for a given task with equipment suitable for another given task.

Most often, the operation equipment is heavy duty, such as drone and rescue boat launch and recovery systems, missile launchers etc. for military purposes or e.g., oil collecting equipment or cranes for environmental or offshore constructional purposes. Such heavy-duty equipment is preferable and often located in niches, also referred to as mission bays, along the sides or the stern of the ships and therefore the process of exchanging equipment for different purposes is time consuming and expensive.

Removing such massive heavy-duty equipment of a relatively large size, such as equipment having sizes of a standard 20- or 40-foot container, or more, from a ship, requires cutting open the hull of the ship to lift the equipment out. Even in situations where the equipment is located in mission bays at the side or the stern of the ship, the operation is extremely time-consuming and complicated, as cranes are made for lifting in a vertical direction and not for lifting sideways.

It is an object of the present invention to provide a lift for loading equipment modules, or cargo containers sideways into a mission bay of a sea vessel, such as an opening into the side or stern of a ship, which can be done with minimal human engagement and within a minimal period of time.

The above object and advantages, together with numerous other objects and advantages, which will be evident from the following description of the present invention, are according to a first aspect of the present invention obtained by:

A lift for sideways loading of equipment modules, or cargo containers, onto a mounting surface of a sea vessel, such as a ship or submarine where the equipment modules can have sizes substantial equal to, or exceeding the dimensions of standard shipping containers, such as 20- or 40-foot containers. The lift comprises:

a frame for supporting the equipment modules or cargo containers, the frame comprises:

a number of conveying beams for conveying the equipment module or cargo container in a sideways direction in relation to the frame, and means for lifting the conveying beams in a vertical direction.

The above-defined lift provides a solution to the object of the invention, as the lift may be controlled by only a single operator and may exchange an existing equipment module within the mission bay with a new equipment module, in as little as four hours. It is hereby possible to convert a sea vessel configured for one specific operation task to another type of operation task within just a few hours, whereby the costs for conversion are minimized.

The lift preferably comprises a motorized frame which is suitable for lifting the heavy-duty equipment modules, which may weigh more the 30 tons, and is able to transport the equipment modules across a ground surface, such as across a harbor quay and into a loading position, in relation to a sea vessel, such as a ship. The lift is for safety reasons arranged for transportation of the heavy-duty equipment at low speeds, such as below 10 km/h, such as approx. 5 km/h, preferably maximal 5 km/h and approx. 1 km/h with maximum load.

The lift comprises a number of wheel arrangements, where each wheel arrangement comprises at least one wheel, and preferably two wheels, connected to the lift frame by a suspension arrangement, comprising means for lifting the entire frame above the ground in a transportation mode, and for lowering the frame onto the ground, in a non-transportation mode. Preferably, the lift comprises four wheel arrangements, but may alternatively be arranged with fewer or more wheel arrangements.

The wheel arrangements are constructed such that each wheel arrangement may turn around a vertical axis independently of each other, such that the lift may maneuver across the ground in any direction.

The lift comprises a brake system for engaging the wheel arrangements, and preferably for engaging the wheel arrangements independently of each other. The lift may comprise an electromagnetic brake system, which is actuated by the spring force, when electricity is not flowing, such as if the power source of the lift fails. Such brake system provides excellent performance in emergency braking, when power is failing, holding stopped positions for longer periods of time, preventing machinery from coasting down, etc.

The lift may have any suitable type of power source known within the technical field for delivering suitable power, but as the lift is preferably hydraulic operated, the lift comprises a hydraulic pump, also known as a hydraulic power unit (HPU). The HPU may preferably be driven by an engine, such as a diesel engine.

The lift comprises a control system for operating the functions and maneuvering of the lift and is configured for controlling all wheel arrangements together or independently.

The frame for supporting the equipment modules or cargo containers, comprises a number of conveying beams for supporting and conveying the equipment modules or cargo containers in a sideways direction in relation to the frame, such that the modules or containers can be sideways loaded into the sea vessel.

The conveying beams are sideways extendable and are dimensioned such that they are able to span the distance between the hull of the sea vessel and the frame, which is typically between 1.5-2 meters. The conveying beams may however be dimensioned for spanning longer distances.

Preferably the lift comprises between 2 and 8 conveying beams, such as preferably 4 conveying beams, but may alternatively comprise a single wide dimensioned beam element or more than 8 conveying beams depending on the need.

Two or more of the conveying beams may be interconnected by transverse supporting elements, such as steel girders, for providing increased stability of the beams.

The conveying beams may be operated between two positions, a first position which is a fully retracted position in which the equipment module or container is fully supported onto the lift, such that the center of gravity of the module or container is within the boundary of the lift, and preferable coincident with the center of gravity of the lift, and a second position, where the conveying beams are fully expanded, such that the center of gravity of the module or container is outside the boundary of the lift, such as within the periphery of the sea vessel. The conveying beams may assume any position between the fully retracted and fully expanded position.

The loader may be arranged for lifting the equipment modules or containers in their transverse direction into the mission bay. In this embodiment, it is preferred that the lift comprises four conveying beams for supporting the equipment modules or containers. Alternatively, the loader may be arranged for loading the equipment modules or containers in their longitudinal direction, into the side or stern of a sea vessel. In the embodiment, the equipment modules or containers may be supported with fewer than four conveying beams, such as two conveying beams.

In both embodiments, the lift may comprise between 2 and 8 conveying beams.

In the embodiment where the lift is arranged for loading the equipment modules and containers in their longitudinal direction, the conveying beams are in their fully retracted position preferable arranged longer compared to the embodiment for transverse loading.

The lift may further comprise means for adjusting the individual distance between the conveying beams. The conveying beams may in an example, be arrange on individual displaceable elements, located between the conveying beams and the base frame, such that the conveying beams may be displaced, e.g., by hydraulic cylinders and rails in a transvers direction of the conveying beams. The lift may be arranged with different suitable means for displacing the conveying beams.

The lift further comprises means for lifting the frame and the conveying beams in a vertical direction. As the lift is suitable for loading equipment modules or containers into large sea vessels, such as large ships, the mission bay, which is the opening into the hull into which the module or container is to be loaded, is located several meters above ground level, and typically between 1 and 10 meters. The means for lifting should therefore be suitable to lift the module or container at least by that distance, and preferably between 1.5 to 6 meters.

The lift preferably comprises four lifting towers, which are constructed as four hydraulic cylinders, each cylinder being arranged at each corner of the lift. An alternative to hydraulic cylinders could be a rack and pinion system, which is especially suitable if the lifts need to perform loading above 6 meters. The lift hereby comprises two ends, each end having two interconnected hydraulic towers, configured to be operated by the control system and the HPU together or independently. When loading a module or container into a sea vessel, the ground surface may not be entirely planar with the sea level, and height of the lift may thus be adjusted at each end.

According to a further embodiment of the first aspect of the invention, the frame comprises a horizontally expandable and/or displaceable base frame, where the number of conveying beams are connected to the base frame, such that the lift may accommodate modules or containers of different sizes and/or performing a displacement of the conveying beams in a direction substantial parallel to the longitudinal direction of the conveying beams.

The frame preferably comprises an expandable base frame, such that the lift may accommodate equipment modules or containers of different sizes, such sizes corresponding to 20- or 40-foot containers, or smaller and even larger sizes. An equipment module may thus have a size corresponding to up to several 40-foot containers such as four containers, two containers arranged side by side and two further containers arranged on top of the first two.

A further advantage by arranging the base frame as being expandable, is that the lift itself may be transported as a module, such as a module have a size corresponding to a 40-foot container in length and two 40-foot containers in width. It is thus possible to load the lift itself onto a transportation means such as a sea vessel or a truck etc. The base frame preferable comprises a telescopic element, and preferably at least two telescopic extendable elements such as hydraulic cylinders arranged expandable between the two ends of the lift, each end having two interconnected lifting towers, such that when the telescopic elements of the base frame expand, the distance between the two ends of the lift increases. The telescopic elements preferably comprise a middle part and an extendable projecting element arranged at each end of the middle part and connected to the two interconnected lifting towers at each end.

The base frame preferably comprises hydraulic driven telescopic elements, being operated by the control system and the HPU.

The base frame is preferably further arranged such that the middle part is displaceable by the extendable projecting elements towards either end of the lift, such that the conveying beams connected to the middle part can be displaced towards either end on the lift. This is particularly advantageous in a situation where the sea vessel is not completely stationary in a direction substantial perpendicular to the conveying beams. The displacement of the middle part of the base frame, thus compensates for the displacement of the sea vessel such that the conveying beams are maintained stationary with respect to the mission bay.

The displacement of the base frame is preferably performed by the control system and the HPU.

The lift may further comprise a reference camera which, together with a reference mark on the hull of the vessel and the control system, monitors and controls any of such displacement of the base frame.

According to a further embodiment of the first aspect of the invention, the conveying beams comprise a first beam element connected to the base frame, and a second beam element arranged substantially horizontally displaceable in relation to the base frame.

As described above, the conveying beams are longitudinal expandable, and each conveying beam comprises at least a first element which is connected to the base frame and a second beam element which is interconnected with and arranged longitudinal displaceable in relation to the first beam element. The equipment module or container is being supported by the second beam element, such that a displacement of the second beam element causes a sideways displacement of the equipment module or container, in relation to the lift and into the mission bay.

According to a further embodiment of the first aspect of the invention, the conveying beams comprise a third beam element arranged between the first and second beam elements and arranged substantially horizontally displaceable in relation to the base frame.

As also described above, the conveying beams are dimensioned such that they are able to span at least the distance between the hull of the sea vessel and the frame, which is typically between 1.5-2 meters. The conveying beam therefore preferably comprises a third beam element displaceable arranged between the first and second beam elements. A longitudinal displacement of the third beam element in relation to the first beam element causes both the third and second beam elements to displace, and a further displacement of the second beam element in relation to the third beam element arranges the conveying beams in the maximum expandable position.

According to a further embodiment of the first aspect of the invention, the third beam element, at an outer end thereof, comprises a connection element for interconnection with a part of the sea vessel.

In order to safely interconnect the conveying beams and the sea vessel while the equipment module or container is being loaded to ensure a correct loading, the third beam element, at the proximal end, which is the end towards the sea vessel, comprises a connection element, which can interconnect with a part of the sea vessel, such as an opening in the floor of the mission bay. The conveying beam is hereby secured into the mission bay against any horizontal movement between the sea vessel and the conveying beams.

When the equipment module or container is to be loaded sideways into the mission bay, the module or container is arranged into the correct horizontal and vertical position in relation to the opening into the mission bay.

The lift is typically being raised into a position where the module or container is between 1-10 meters above ground, such as preferably between 1.5 to 6 meters, and the conveying beams, with the module or container supported by the second beam elements, being sideways displaced into the mission bay, such that the module or container is located within the perimeter of the hull.

The conveying beams preferably have a drive mechanism, such as a hydraulic actuator or an electric gear drive, for performing the displacement. The drive mechanism, when the connection beams are interconnected with the vessel, preferably assumes a passive state, such that any sideways movement of the sea vessel allows a longitudinal displacement of the conveying beams.

The conveying beams are in a preferred embodiment connected to the base frame via a hinge at the distal end of the conveying beam, and the proximal end, which is the end closest to the sea vessel, is only supported by the base frame. The proximal end of the conveying beams is hereby vertically displaceable in relation to the base frame, such that the ends can move in a vertical direction as a result of any tilting rotation of the sea vessel.

According to a second aspect of the present invention, the above objects and advantages are obtained by:

A method for sideways loading of equipment modules or cargo containers onto a mounting surface of a sea vessel, such as a ship or submarine or any other type of marine vessel. The equipment modules may have sizes substantial equal to, or exceeding the dimensions of standard shipping containers, such as 20- or 40-foot containers. The method comprising the following steps:

providing a lift as described above and at least comprising a frame for supporting the equipment modules or cargo containers, where the frame comprises:

a number of conveying beams for conveying the equipment module or cargo container in a sideways direction in relation to the frame, and means for lifting the conveying beams in a vertical direction, arranging an equipment module or cargo container onto the lift, maneuvering the lift on a ground surface into a position substantial parallel with the hull of the sea vessel, at a specific location, raising the equipment module or cargo container by the lift in a vertical direction to a specific vertical position in relation to a mission bay in the hull, conveying the equipment module or cargo container sideways into the mission bay, by the conveying beams, connecting the equipment module or cargo container to an anchoring point within the mission bay, retracting the conveying beams out of the mission bay.

The above-defined method solves the object to provide a method, which by the above-defined lift is to, in a safe way and within a minimum of time, load an equipment module or cargo container sideways into a mission bay of a sea vessel, such as an opening into the side or stern of a ship. Before loading the module or container into the mission bay, the empty lift is prepared for receiving the module or container. The lift may typically by loaded with the module or container in the vicinity of the sea vessel by a suitable crane, such as a gantry crane, which is able to perform a vertical lift of the module or container from a storage or e.g., a truck onto the lift, where the module or container is being supported by the conveying beams. The lift may comprise projecting supporting elements, which projects into openings in the bottom surface of the module/container, for ensuring the module or container is in the correct position on the lift, and for preventing the module/container to unintentionally slide on the conveying beams during operation.

After the lift has maneuvered into the correct position on the dock, and the conveying beams lifted into a correct height, the conveying beams are conveyed sideways into the mission bay where the container is afterwards connected onto the deck surface of the mission bay, by suitable connection means, such as means functioning in the same fashion as standard container twist locks. The modules or containers are preferably arranged with standard ISO container corners, such that the modules or containers in the most basic embodiment, can be connected to other transportation means by standard twist locks.

After the module or container has been safely connected within the mission bay for securing the module or container inside the sea vessel, the conveying beams are retracted.

According to a further embodiment of the second aspect of the invention, the step of arranging an equipment module or cargo container onto the lift, comprises the step of expanding the frame in a horizontal direction according to a horizontal dimension of the equipment module or cargo container and lowering the equipment module or cargo container, e.g., by use of a gantry crane, onto the conveying beams.

The frame preferably comprises an expandable base frame, such that the lift may accommodate equipment modules or containers of different sizes, such sizes corresponding to 20- or 40-foot containers, or smaller and even larger sizes. An equipment module may thus have a size corresponding to up to several 40-foot containers such as four containers, two containers arranged side by side and two further containers arranged on top of the first two.

According to a further embodiment of the second aspect of the invention, the lift comprises a number of wheels, and the step of maneuvering the lift comprises the step of adjusting the wheels around an axis being substantially perpendicular to the ground surface.

By arranging the lift with wheels which are rotatable around an axis substantially perpendicular to the ground level, the lift has maximum maneuvering flexibility, such that the lift can maneuver in relation to the sea vessel in any direction. This is particularly advantageous in the situation where the lift is not completely parallel with the side of the hull and therefore needs to be adjusted.

According to a further embodiment of the second aspect of the invention, the step of maneuvering the lift, comprises the step of adjusting the position of the lift in relation to a reference marker, such as a vertical oriented marker arranged on the hull, by use of a senser, such as a reference camera arranged on the lift, and/or by sensing the distance between the lift and the hull by a distance sensor.

It is necessary for the lift to be correctly positioned on the ground level, in relation to the hull, such that the lift has the correct position in relation to the opening into the mission bay. If the lift is not substantially parallel with the hull or not positioned in a center position below the mission bay, the equipment module or container cannot be conveyed sideways into the mission bay.

It is therefore preferred that the lift comprises a sensor, such as a reference camera, and/or a distance sensor, such as a laser distance sensor, which together with the control unit, in relation to a reference marker such as a vertical line arranged on the sea vessel, monitors and regulates the position of the lift in a direction substantially parallel with the hull. The control unit determines—based in the captured image by the sensor and/or the distance sensor—the exact position of the lift in relation to the hull. The lift preferably comprises a distance sensor arranged at each end of the lift.

According to a further embodiment of the second aspect of the invention, the step of raising the equipment module or cargo container by the lift in a vertical direction, to a specific vertical position in relation to a mission bay in the hull, comprises the step of controlling the raising of the equipment module or cargo container in relation to a reference marker, such as a horizontally oriented reference marker on the hull, by a control unit and a sensor, such as a reference camera arranged on the lift.

Besides a correct position on ground level, centrally in front of the mission bay the conveying beams need to assume a specific vertical position in order for the conveying beams to extend sideways into the mission bay. If the conveying beams are not at a correct specific vertical level, either too high or too low, the top of the equipment module or container may collide with the upper edge of the opening into the mission bay, or the conveying beams may collide with the lower edge of the opening into the mission bay.

It is therefore preferred that the lift comprises a sensor, such as a reference camera, which together with the control unit, in relation to a reference marker such as a horizontally oriented reference marker arranged on the sea vessel, monitors and regulates the position of the conveying beams in a vertical direction by controlling the lifting towers.

Preferably the horizontal and vertical adjustment of the lift is performed with the same sensor, such as the same reference camera.

According to a further embodiment of the second aspect of the invention, the step of conveying the equipment module or cargo container sideways into the mission bay by the conveying beams, comprises the step of displacing the conveying beams in a longitudinal direction thereof, sideways towards the hull and into engagement with the vessel, such that the conveying beams interconnect therewith.

In order to safely convey the equipment module or container into the mission bay, it is preferred to interconnect the conveying beams and the sea vessel while the equipment module or container is being loaded. The conveying beam therefore comprises a connection element, which can interconnect with a part of the sea vessel, such as an opening in the floor of the mission bay. The conveying beams are hereby displaceable secured into the mission bay against any horizontal movement between the sea vessel and the conveying beams.

According to a further embodiment of the second aspect of the invention, the step of conveying the equipment module or cargo container sideways into the mission bay, by the conveying beams, further comprises:

- the conveying beams have a drive mechanism for performing the displacement, the drive mechanism, when the conveying beams are interconnected with the vessel, having a passive state, such that the displacement of the conveying beams is a result of any sideways movement of the sea vessel, and/or

- the conveying beams, at the ends closest to the hull, being vertically displaceable in relation to the base frame, such that the ends can move in a vertical direction, as a result of any tilting rotation of the sea vessel, and/or
- the conveying beams being displaceable in a direction perpendicular to a longitudinal direction of the conveying beams, by displacing the base frame in a horizontal direction, preferably by a control unit and a sensor, as a result of any longitudinal movement of the sea vessel.

The conveying beams preferably have a drive mechanism, such as a hydraulic actuator, for performing the displacement. The drive mechanism, when the conveying beams are interconnected with the sea vessel, preferably assumes a passive state, such that any sideways movement of the sea vessel allows a longitudinal displacement of the conveying beams.

The conveying beams are in a preferred embodiment connected to the base frame via a hinge at the distal end of the conveying beam and the proximal end, which is the end closest to the sea vessel, only supported by the base frame. The proximal end of the conveying beams is hereby vertically displaceable in relation to the base frame, such that the ends can move in a vertical direction as a result of any tilting rotation of the sea vessel.

The base frame is preferably further arranged such that the middle part is displaceable towards either end of the lift, such that the conveying beams connected to the middle part can also be displaced towards either end on the lift. This is particularly advantageous in a situation where the sea vessel is not completely stationary in a direction substantial perpendicular to the conveying beams. The displacement of the base frame thus compensates for the displacement of the sea vessel, such that the conveying beams are maintained stationary with respect to the mission bay.

The displacement of the base frame is preferably performed by the control system and the HPU.

According to a further embodiment of the second aspect of the invention, the step of connecting the equipment module or cargo container to an anchoring point within the mission bay further comprises the step of locking the equipment module or cargo container to a connecting element and lifting the equipment module or cargo container by a lifting element, in a vertical direction in relation to the conveying beams.

After loading the equipment module or container into the mission bay, it is necessary to interconnect the module or container with the mission bay, such as an interconnection with the mission bay floor. Therefore, the mission bay floor is preferably arranged with a "footprint" which comprises a number of connecting elements which corresponds to a number of cooperating elements on the modules or containers, such as standard ISO container corners. The connecting elements may thus be arranged with an upper interconnection part having dimensions and function as a standard twist lock. However, as standard twist locks are manually operated, there is a need for an automation of the connecting elements.

The connecting elements, which upper interconnection part functions as a standard twist lock, are automatically vertically displaceable installed within the footprint, and preferable integrated into the mission bay floor.

The connecting elements are arranged in a retracted position when the module or container is being loaded, and when the module or container has been loaded within the mission bay, the connecting element assumes a projected position, where the upper interconnection part projects into the cooperating elements of the modules or containers, such as standard ISO container corners, and assumes a locked position. The module or container is hereby interconnected with the mission bay.

When the module or container has been lifted into the mission bay, the conveying beams which support the module or container need to be retracted. For that purpose, the mission bay is arranged with a number of lifting elements, which, when the module or container is at the correct position within the mission bay, projects from the mission bay floor and lifts the module or container in relation to the conveying beams, such that the conveying beams can be retracted.

The lifting elements are lowered afterwards such that the module or container rests on the footprint.

The lift may control the position of the equipment module or container in relation to the footprint, and hereby also in relation to the connecting elements via the sensor, such as a reference camera, which together with the control unit, in relation to the reference marker, monitors and regulates the extension of the conveying beams in the horizontal direction in relation to the connecting elements. The control unit preferably obtains information about the distance from the equipment module or container to the connecting elements from the reference marker, such that the equipment module or container can be correctly positioned within the mission bay. In case the equipment module is not in full size, and therefore occupies fewer connecting elements within the mission bay, the control unit may be programmed with input from an operator, on what number of connecting elements, and where (on what part of the footprint) within the mission bay, the equipment module or container is to be loaded.

According to a further embodiment of the second aspect of the invention, the connecting element and the lifting element are integrated.

The connecting element and the lifting element are preferably constituted by the same element. The connecting element/lifting element thus comprises an upper abutment surface, which abuts the lower surface of the cooperating elements of the modules or containers. The upper interconnection part of the connecting element/lifting element, which functions as a standard twist lock, projects from the abutment surface and into the cooperating elements of the modules or containers. The connecting element/lifting element is thus able to both perform a locking and a lifting function.

According to a further embodiment of the second aspect of the invention, the step of retracting the conveying beams out of the mission bay comprises the step of raising the conveying beams a predetermined vertical distance before being retracted sideways out of the mission bay.

After the connecting element/lifting element has lifted the module or container from the conveying beams, the lift raises the conveying beams by a predefined distance, such that the connection beams are disconnected from the sea vessel.

The second and third beam elements are preferably retracted out from below the equipment module or container, to a position above the first beam element, before the entire conveying beams are lifted and hereby disconnected from the vessel.

Figure 12A:
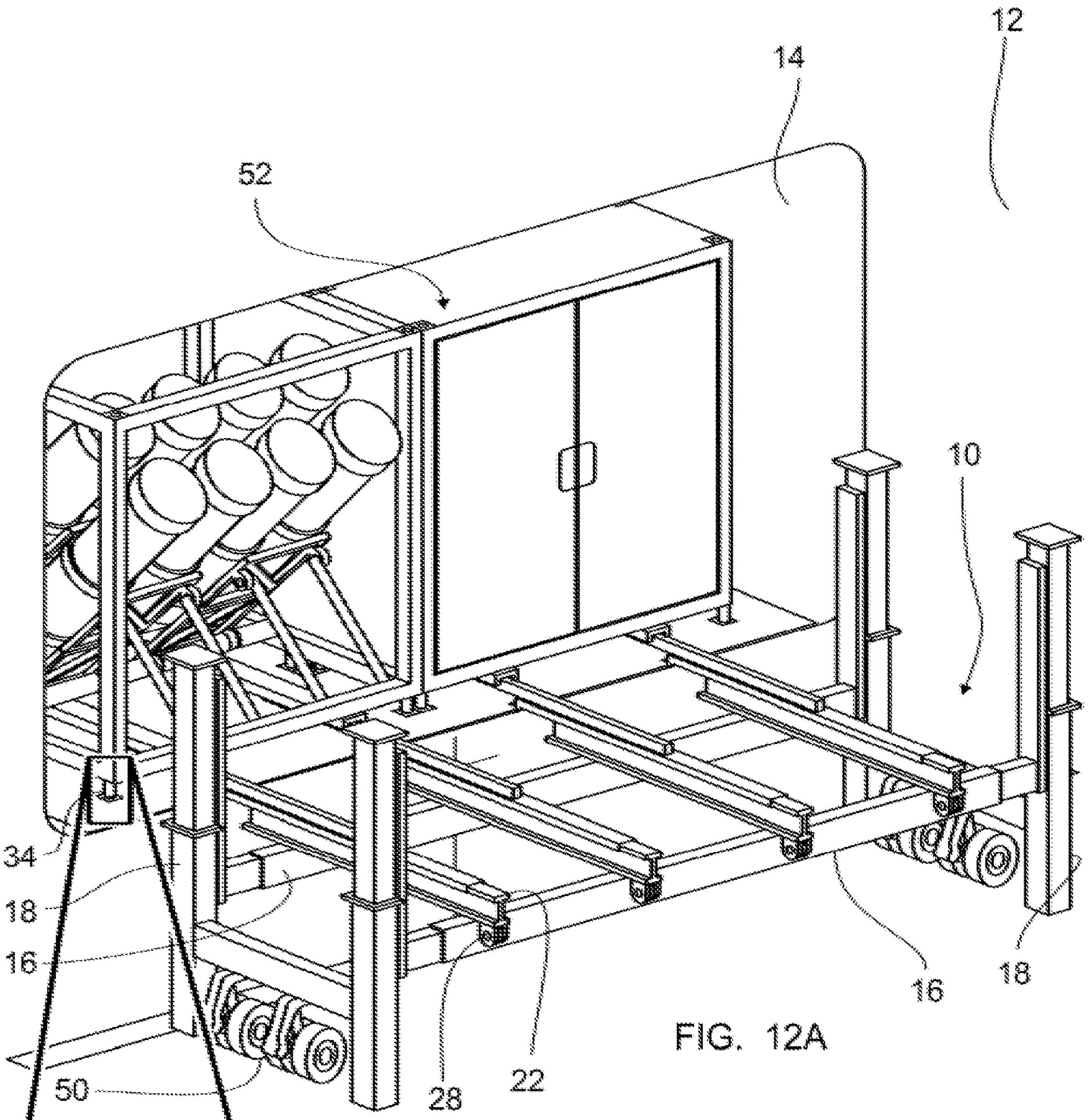
Figures 12B, 12C, 12D, 12E:
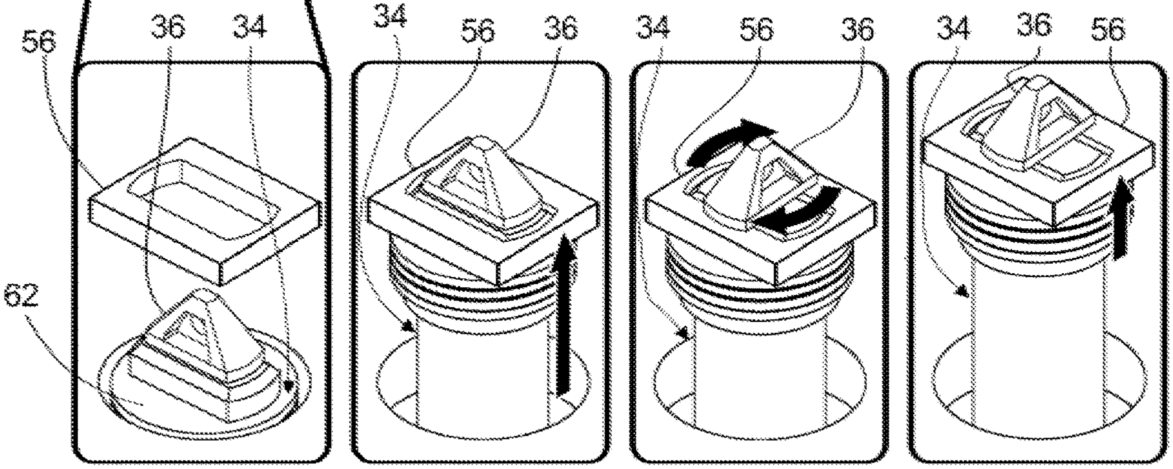

FIG. 125*a*-12E show perspective views of the equipment module being connected to the mission bay.

Figure 13:
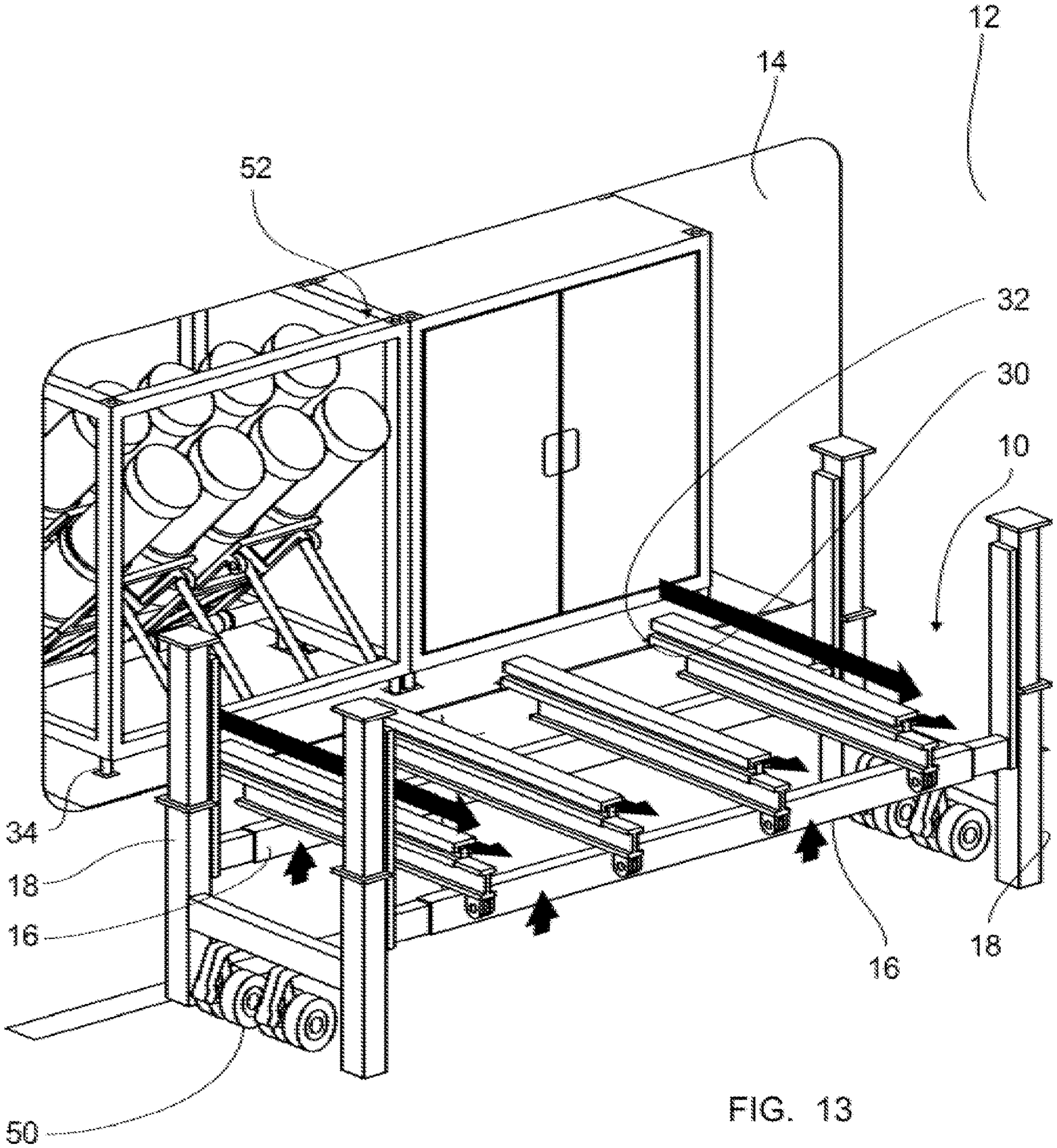

FIG. 13 is a perspective view of the conveying beams being retracted.

Figure 14:
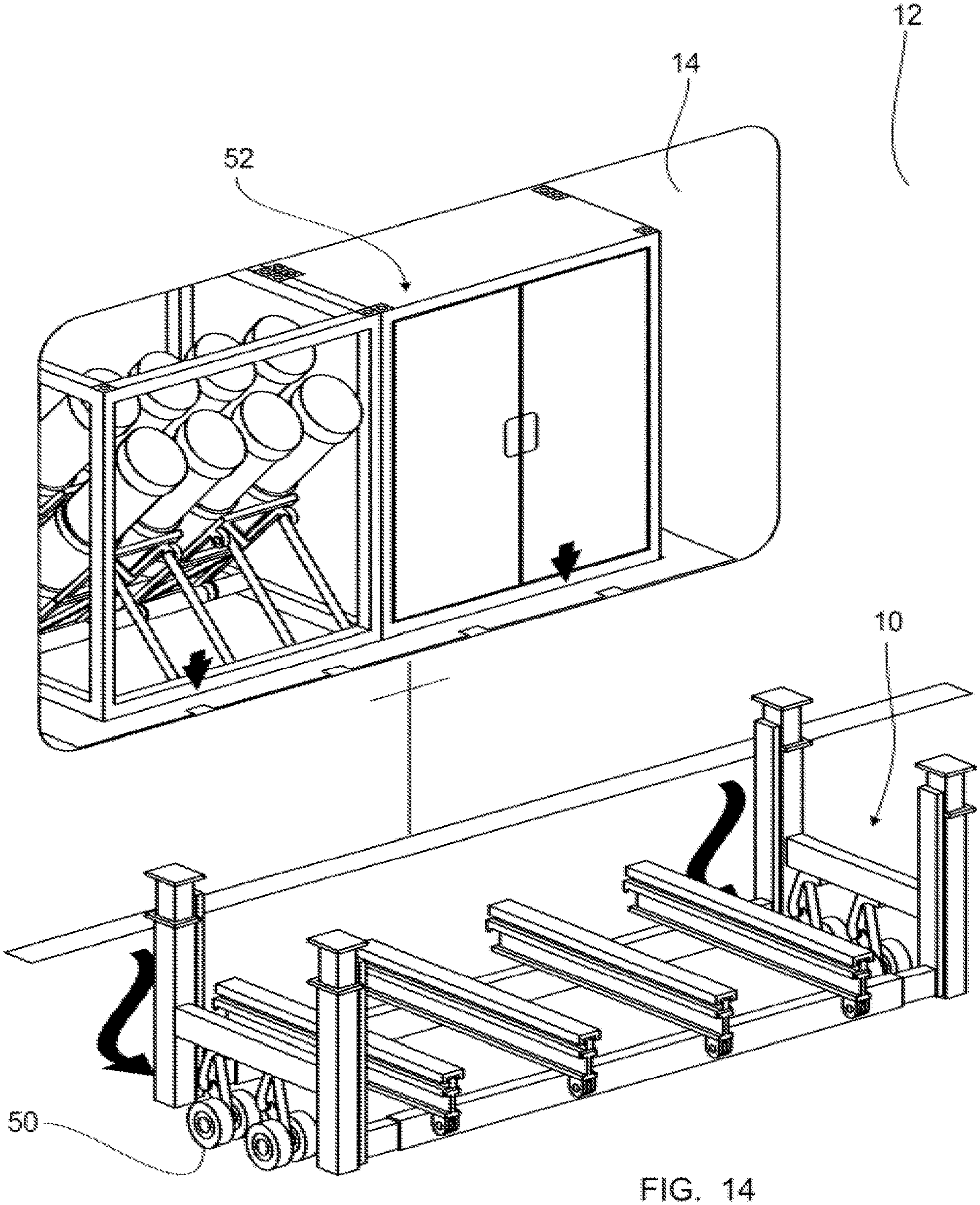

FIG. 14 is a perspective view of the loaded equipment module and the lift.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

Figures 1A, 1B, 1C:
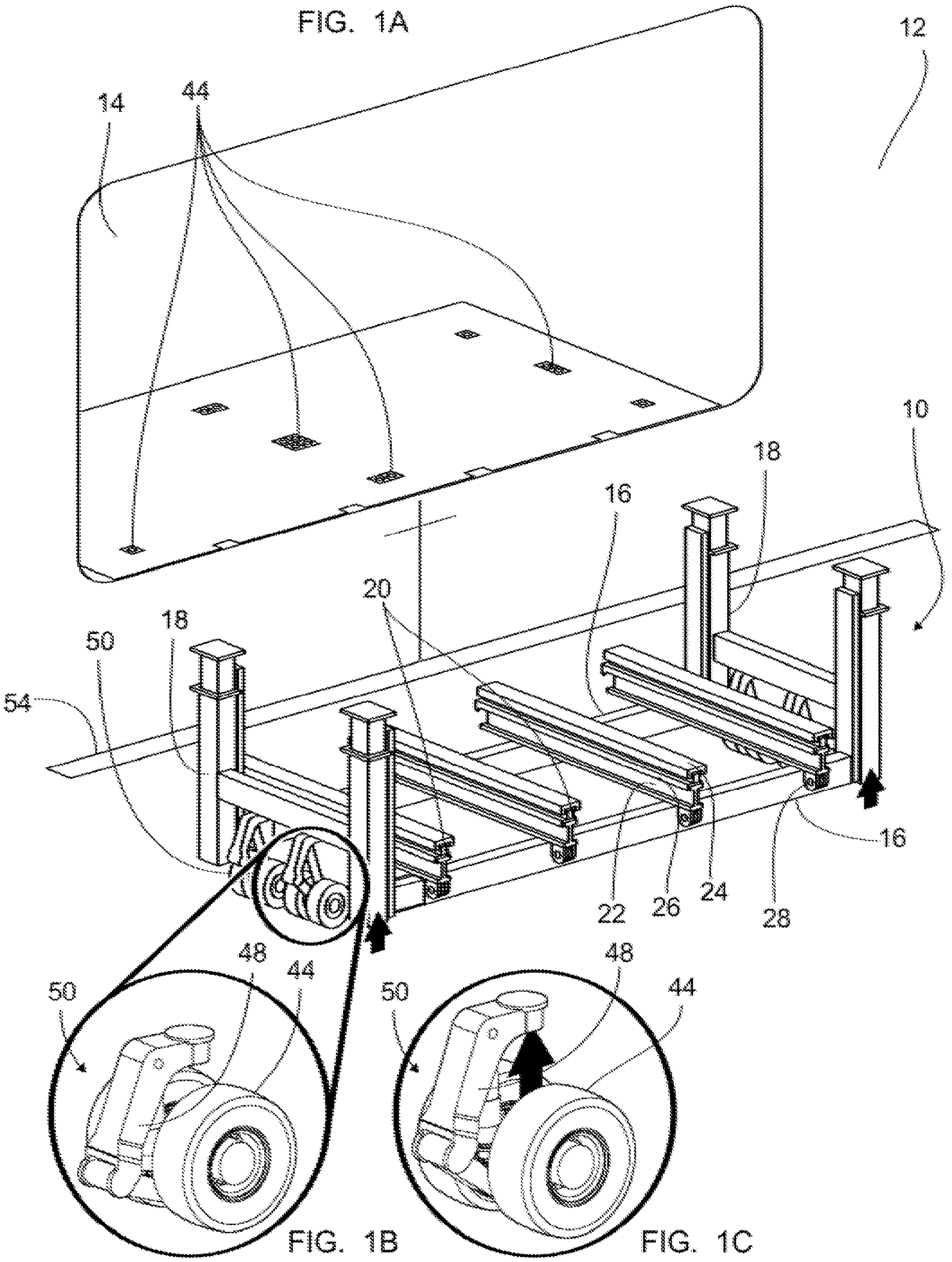
FIG. 1A is a perspective view of the lift and a mission bay.
FIG. 1B-1C are perspective views of the wheel arrangement.

FIG. 1A is a perspective view of the lift 10 and the mission bay 14.

The figure illustrates the lift 10 being located on a harbor quay, in front of a sea vessel having a hull 12 and a mission bay 14, within the hull.

The mission bay 14 which is an opening into the side of the hull 12 is dimensioned, such that containers or equipment modules 52 having a size of several standard cargo containers, can be accommodated within the mission bay 14. Inside the mission bay 14, a mounting footprint 44 is preferably arranged on a mounting surface and is adapted to receive the equipment module 52 or container, in order for it to be secured to the mounting surface, with no risk of unintentional movement of the equipment module 52 or container. The footprint 44 may comprise guiding elements, which guide the modules/container into a correct position, and locking elements, which lock the module/container to the mounting surface, after loading.

The lift 10 comprises a frame for accommodating the equipment module 52 or container, and the frame comprises a base frame 16, shown as two horizontal extending beam elements, which support four conveying beams 20. The conveying beams 20 are each configured to be extendable in their longitudinal direction, such that they are expandable in a direction towards the hull 12.

The conveying beams 20 comprise a first beam element 22, which is connected to the base frame 16. The first beam elements 22 are connected to the distal part of base frame 16, in relation to the hull, by a hinge mechanism 28, and being supported by the proximal part of the base frame 16, such that the conveying beams 20 may pivot around the axis of the hinge 28, whereby the proximal end of the conveying beams 20 can move in a vertical direction. This function will be explained later in relation to FIG. 10.

The conveying beams 20 further comprise a second beam element 24 and a third beam element 26, arranged between the first 22 and second beam elements 24, and arranged substantially horizontally displaceable in relation to the first beam elements 22 and the base frame 16. The conveying beams 16 are dimensioned, such that they are able to span at least the gap 54 between the hull 12 of the sea vessel and the lift 10, which is typically between 1.5-2 meters.

A longitudinal displacement of the third beam elements 26 in relation to the first beam elements 22, causes both the second 24 and third second beam elements 26 to displace towards the hull 12, and a further displacement of the second beam elements 24 in relation to the third beam elements 26, arranges the conveying beams 16 in a maximum expanded position.

The lift 10 further comprises means for lifting the base frame 16 and conveying beams in a vertical direction. The lift 10 is suitable for loading equipment modules or containers into large sea vessels, such as large ships where the mission bay 14 is located several meters above ground level, and typically between 1 and 10 meters, such as between 1.5 and 6 meters. The means for lifting are therefore arranged as hydraulic loading towers 18, preferably arranged at each corner of the lift 10. The loading towers 18 are arranged as hydraulic telescopic cylinders or a rack and pinion drive mechanism, where an upper displaceable part of the loading towers 18 are interconnected with the base frame 16, such that a displacement of the upper displaceable part, causes a lifting of the base frame 16. The loading towers 18 are preferably controlled and operated by a control unit and HPU system (not shown).

FIG. 1B-1C are perspective views of the wheel arrangement 50.

The lift 10 further comprises a number of wheel arrangements 50 connected to the frame, preferable at opposite ends of the frame, as shown. The lift 10 is shown with four wheel arrangements 50, each wheel arrangement 50 comprising two wheels 44 and a suspension arrangement 48, which provides a lifting function for the frame. The wheel arrangements 50 can thus assume a fully lowered position, as shown in FIG. 1B where the frame of the lift 10 rests on the ground surface. In this position, the lift 10 is stationary and cannot maneuver across the ground level. The wheel arrangements 50 can further assume a raised position, as shown in FIG. 1C. In the raised position, the frame of the lift 10 is raised in relation to the ground surface and the lift 10 is able, via the wheels 44, to navigate across the ground surface.

The wheel arrangements 50 are constructed such that each wheel arrangement 50 may rotate around a vertical axis, independently of each other, such that the lift 10 may maneuver across the ground surface in any direction.

Figure 2:
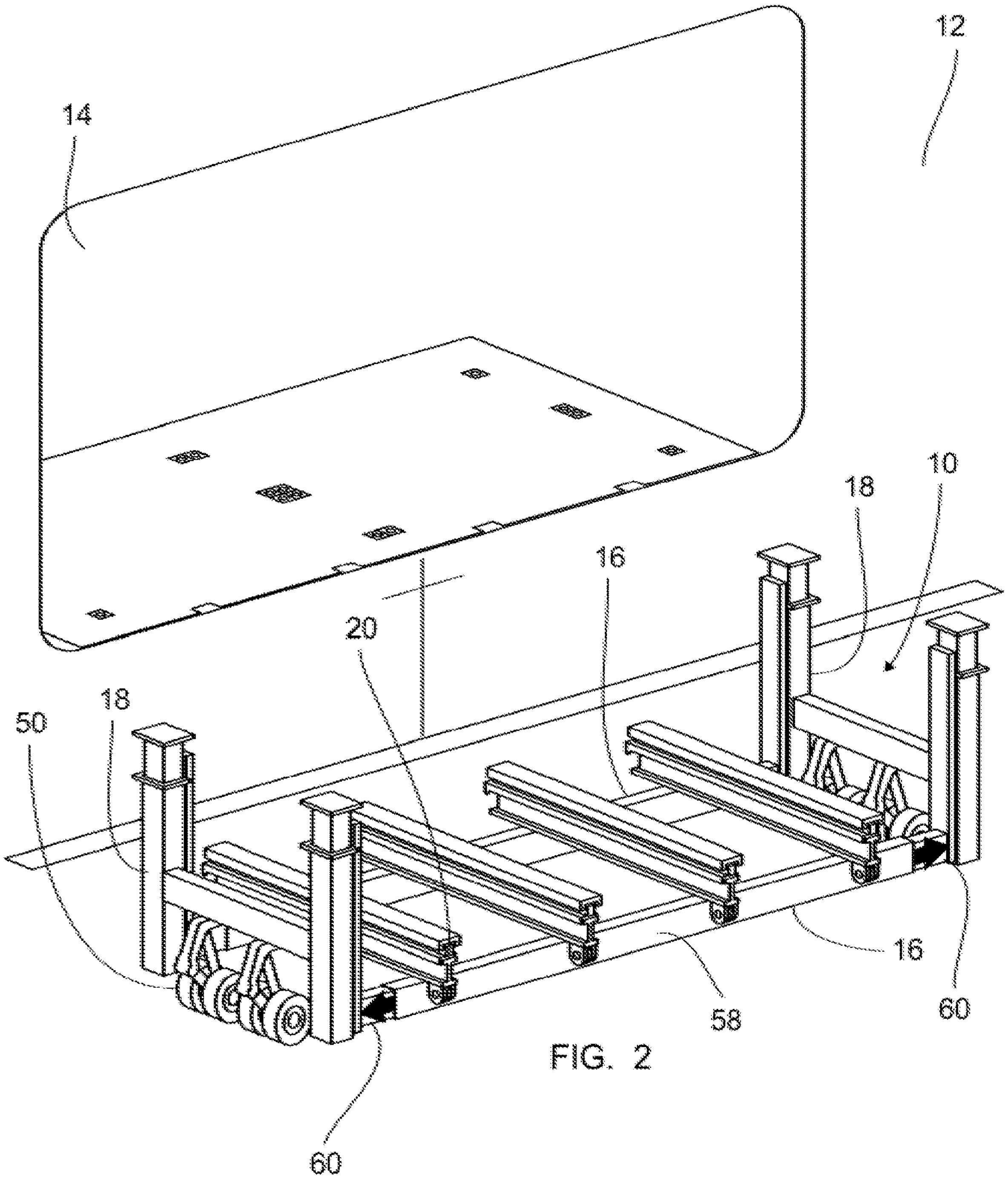
FIG. 2 is a perspective view of the lift being expanded and a mission bay.

FIG. 2 is a perspective view of the lift 10 being expanded and a mission bay 14.

The base frame 16 comprises two telescopic elements, preferable hydraulic telescopic elements, arranged expandable between the two ends of the lift 10, such that when the telescopic elements of the base frame expand, the distance between the two ends of the lift increases.

The telescopic elements comprise a middle part 58 and an extendable projecting element 60, arranged at each end of the middle part 58 and connected to the lifting towers 18 at each end, as illustrated by the arrows.

The base frame is preferable controlled and operated by the control unit and the HPU.

The base frame 16 is preferably further arranged, such that the middle part 58 is displaceable towards either end of the lift 10, such that the conveying beams 20, connected to the middle part 58, can be displaced towards either end of the lift 10. Hereby, the extendable projecting elements 60 move in same direction in relation to the middle part 58.

This is particular advantageous in a situation where the sea vessel is not completely stationary in a direction substantially perpendicular to the conveying beams 20. The displacement of the middle parts 58 of the base frame 16, thus compensates for the displacement of the sea vessel, such that the conveying beams 20 are maintained stationary with respect to the mission bay, which will be further explained in relation to FIG. 10.

Figure 3:
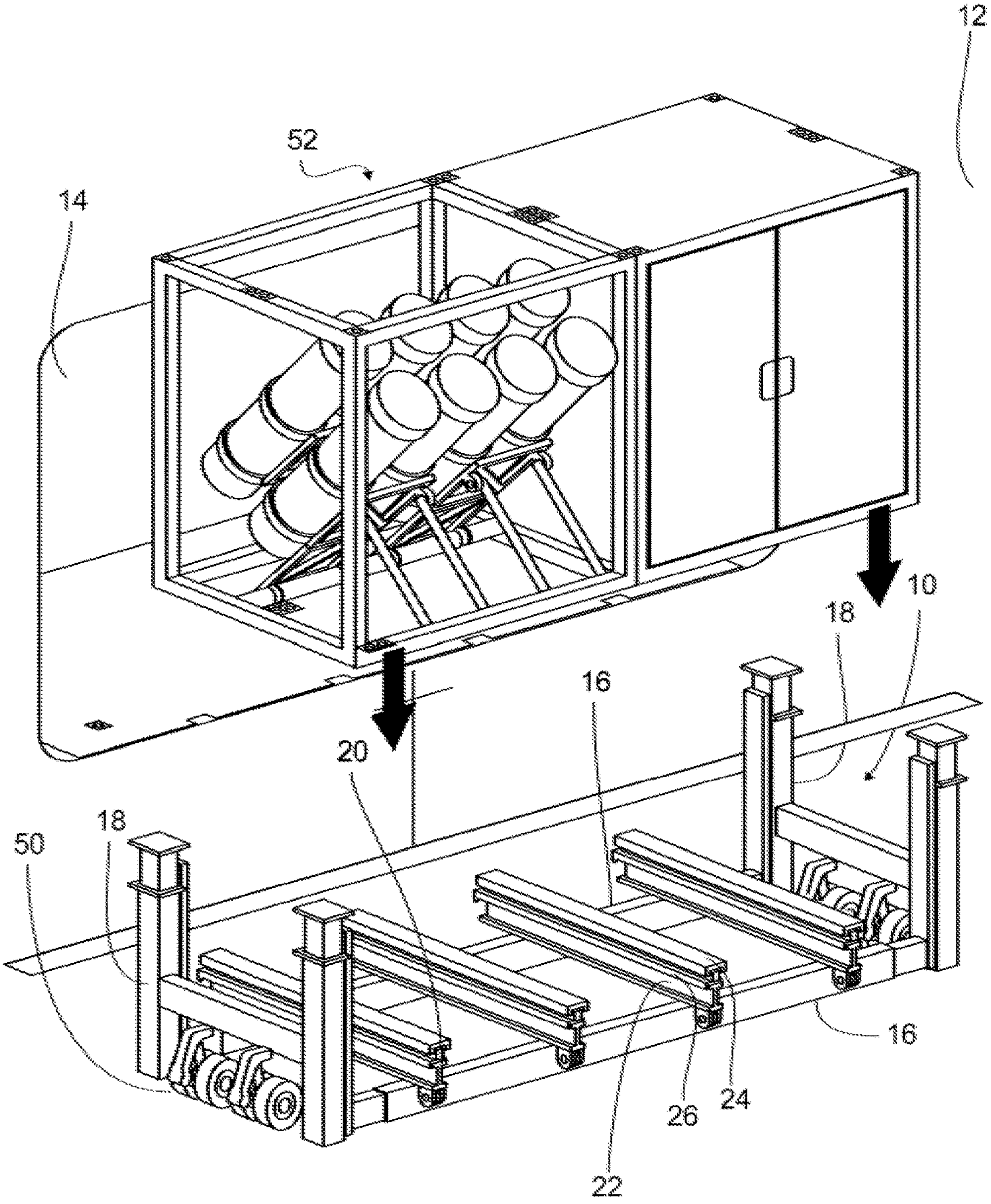
FIG. 3 is a perspective view of the lift, a mission bay and an equipment module being loaded.

FIG. 3 is a perspective view of the lift 10, a mission bay 14 and an equipment module 52 being loaded. The figure shows the base frame 16 being in an expanded position, such that the frame can accommodate the illustrated equipment module 52. The equipment module 52 is shown comprised of two smaller interconnected modules, the left module shows a torpedo launch system, and the right-side module shows a closed-type module including any type of equipment. The entire module 52 may thus be constructed from a single large module or several smaller interconnected modules, but the overall outer dimensions remain the same, such that the different modules having different configurations, correspond to the dimensions of the footprint 44. The module 52 may however have a smaller size than shown in the figure, as long as the base of the module corresponds to a part of the footprint 44 within the mission bay 14, for interconnection.

The shown equipment module 52 is being lifted by a crane (not shown) onto the conveying beams 20, and preferably into engagement with projecting supporting elements (not shown) on the lift, which projects into openings in the bottom surface of the equipment module 52, for ensuring the module 52 in the correct position on the lift 10, and for preventing the module 52 to unintentionally slide on the conveying beams 20 during operation.

Figure 4:
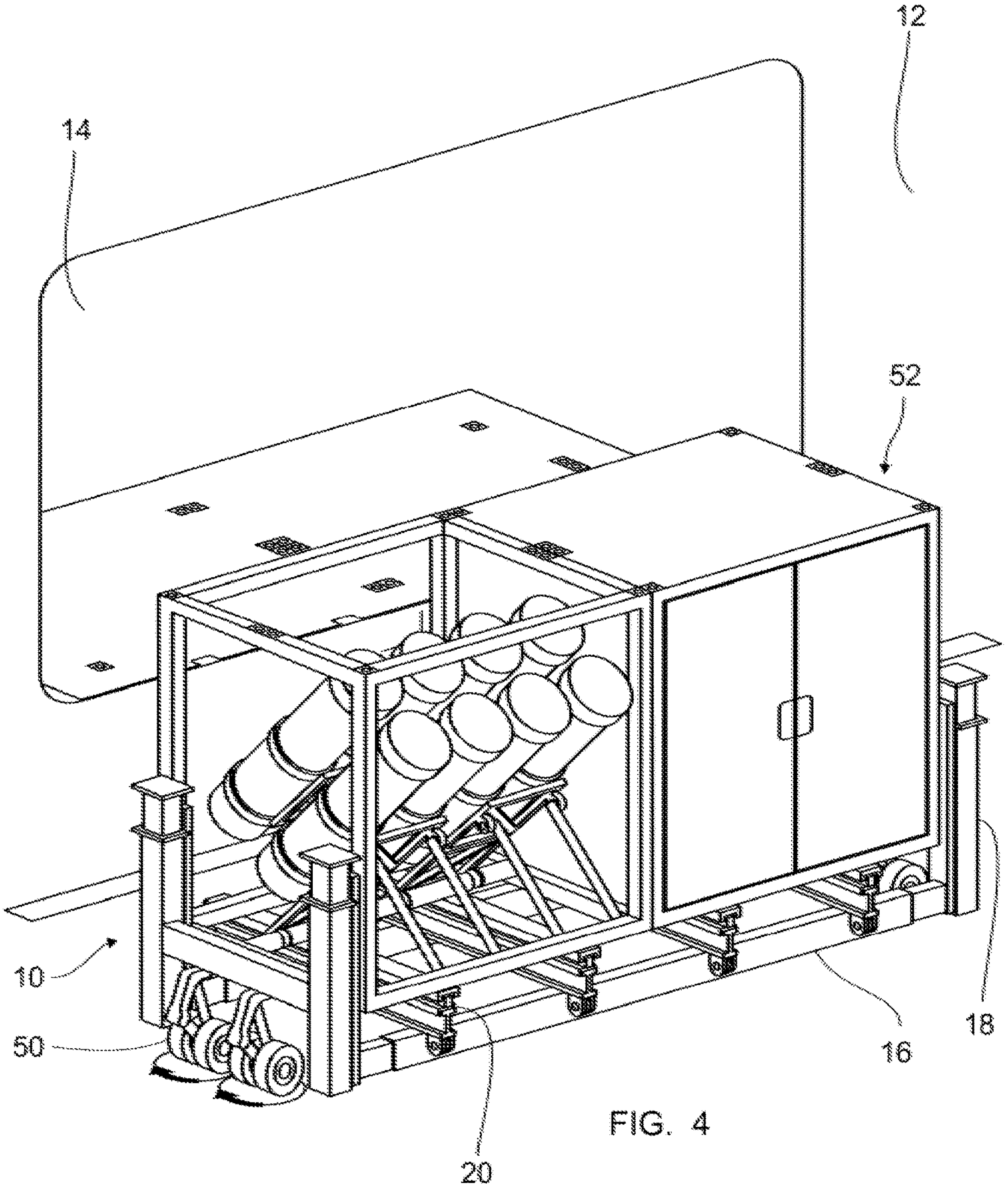
FIG. 4 is a perspective view of the lift with an equipment module being loaded.

FIG. 4 is a perspective view of the lift 10 with an equipment module 52 being loaded. The figure shows a module 52 which is securely loaded onto the conveying beams 20, and ready to be loaded into the mission bay 14. The wheel arrangements 50 of the lift 10 are in a lifted position, such that the frame is raised from the ground surface, and the lift 10 can maneuver towards the sea vessel. The wheel arrangements 50 are rotated around the substantial vertical axis, such that the travelling direction of the wheels are towards the hull 12.

Figure 5:
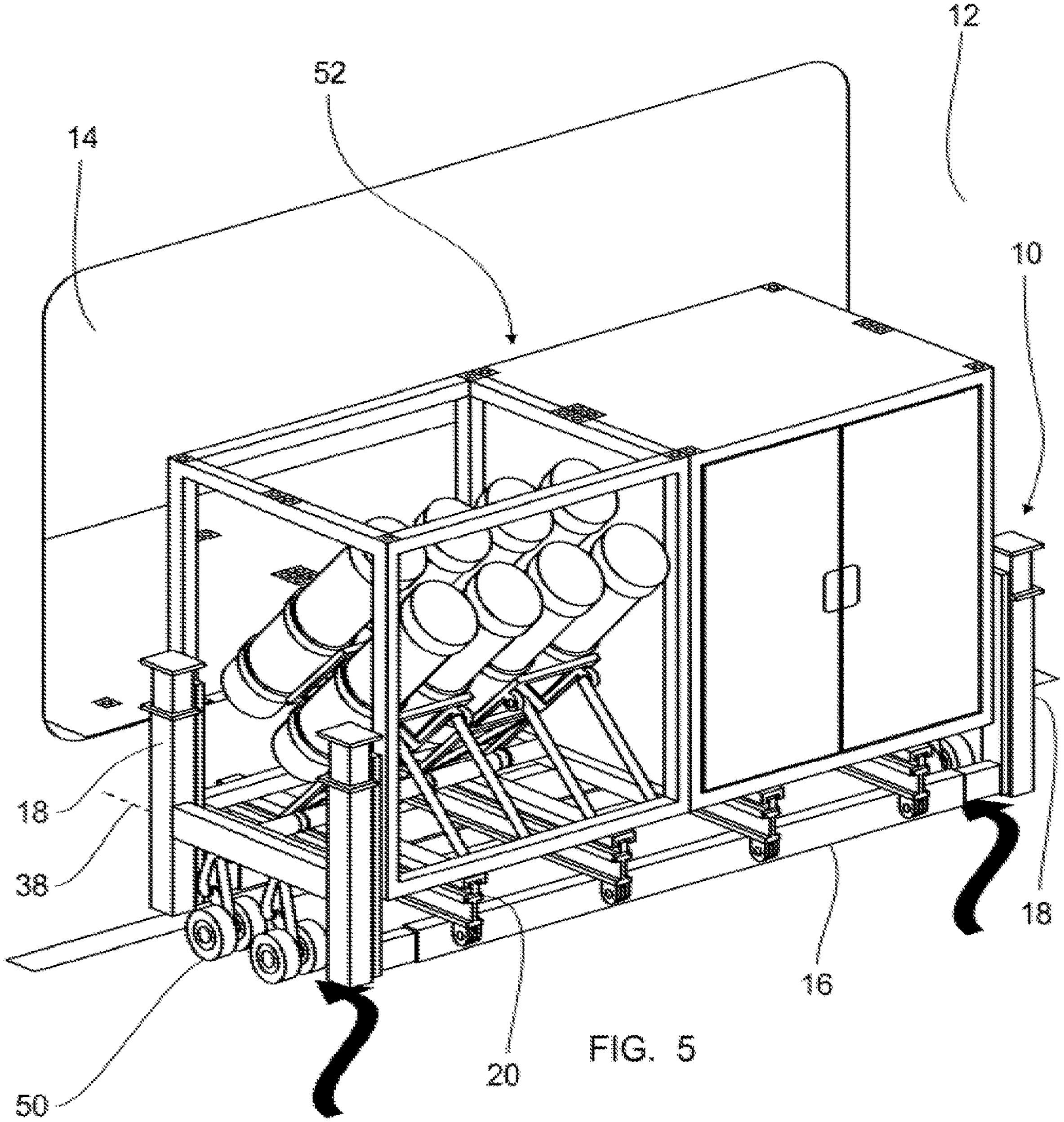
FIG. 5 is a perspective view of the lift with an equipment module being loaded.

FIG. 5 is a perspective view of the lift 10 with an equipment module 52 being loaded.

The lift 10 further comprises a distance guidance system having a distance sensor 38, interconnected with the control unit (not shown) of the lift, such that during maneuvering of the lift 10, the distance between the lift 10 and the hull is continuously monitored.

The lift 10 preferably comprises a distance sensor 38 arranged at each end of the lift, e.g., a distance sensor 38 on each of the proximal loading towers 18.

The lift 10 is via the vertically rotatably wheel arrangements 50 maneuvered into a proximate position in relation to the hull 12.

The distance sensor(s) continuously monitors the distance between the lift and the hull 12, such that the lift 10 cannot exceed a specified minimum distance.

Figure 6:
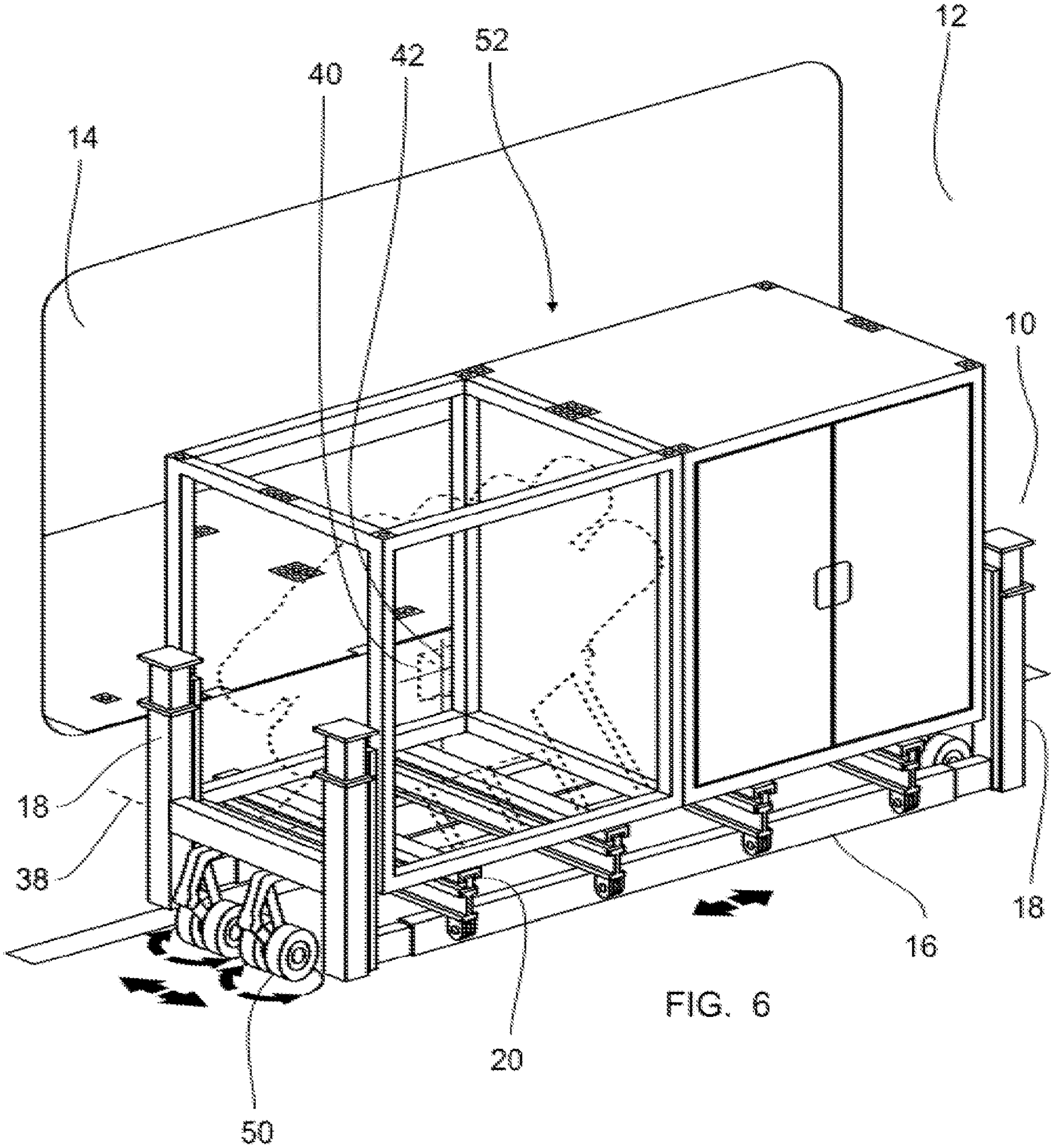
FIG. 6 is a perspective view of the lift with an equipment module being loaded.

FIG. 6 is a perspective view of the lift 10 with an equipment module 52.

The figure shows the lift 10 being maneuvered into a correct position on the ground surface, in front of the center of the mission bay 14.

For that purpose, the lift uses both the distance sensors 38 and a reference senser 40, such as a reference camera.

The reference sensor senses the position of the mission bay 14 by a reference marker 42, which in FIG. 6 is illustrated as a vertical line on the hull 12 below the mission bay. Based on the measured distance between the lift 10 and the hull 12 and the position of the lift 10 in relation to the reference marker 42, the control unit is able to determine the exact position of the lift, in relation to the center of the opening into the mission bay 14. The control unit (not shown) preferably continuously monitors the measured distance and the measured position, and automatically maneuvers the lift 10 into the correct position.

The distance sensors and position sensors may in an alternative embodiment be arranged as a single intelligent reference camera, such as a camera for sensing ArUco markers.

Markers, such as ArUco markers, may be used for storing information such as the position, size, height etc. of the mission bay, such that the control system, when the marker is scanned, receives information in relation to the above and/or e.g., information on how far into the mission bay 14 the equipment module should be loaded. The marker may thus also comprise information, if the marked is not located in the center below the mission bay 14 but offset in relation to the center. The control unit is hereby able to compensate for the offset and maneuver the module into the correct position.

All functions of the lift 10 are preferably controlled automatically, but each function may also be controlled manually by an operator, and the lift 10 therefore also comprises instruments therefore.

Figure 7:
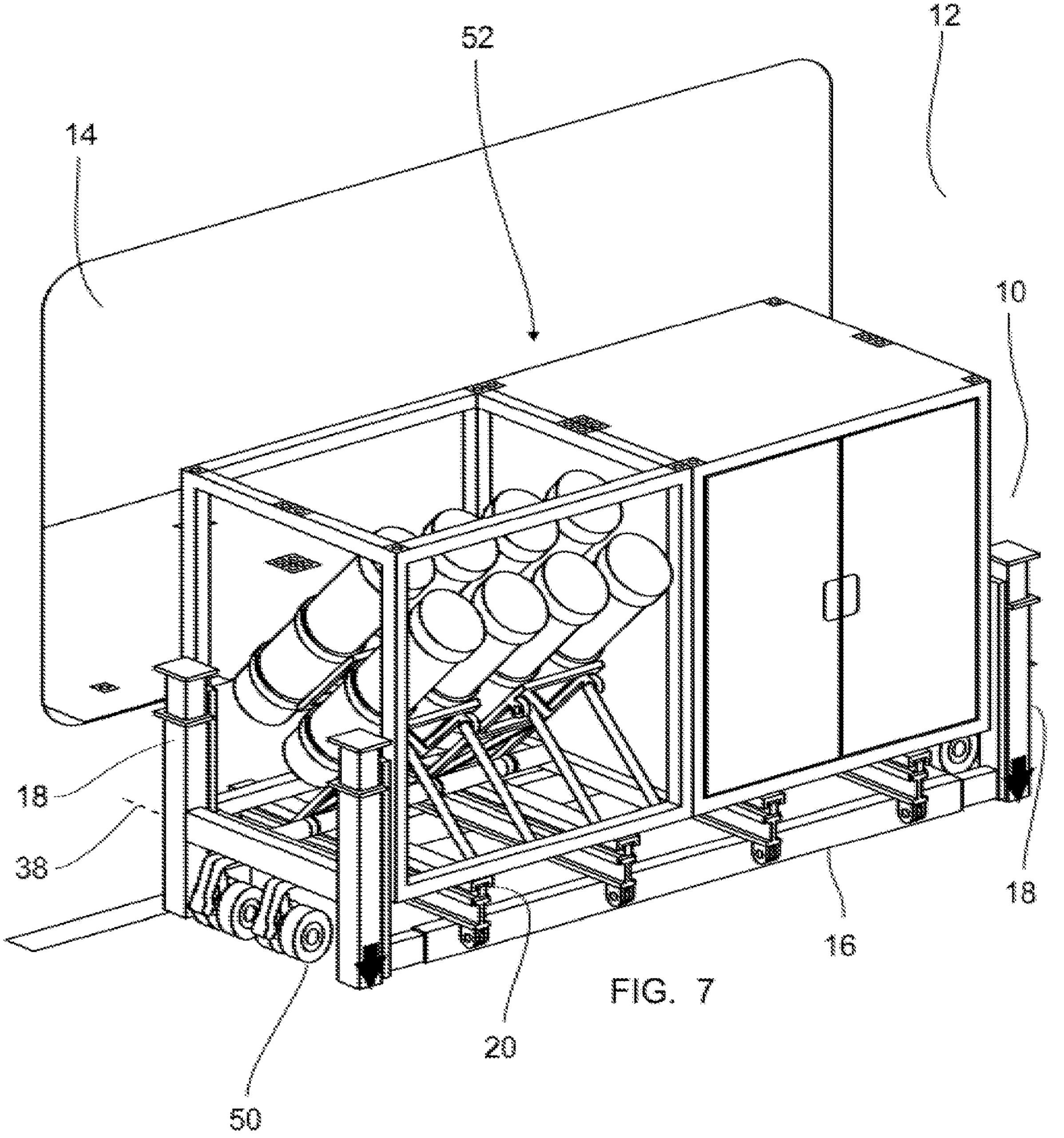
FIG. 7 is a perspective view of the lift with an equipment module being loaded.

FIG. 7 is a perspective view of the lift 10 with an equipment module 52 being loaded. Once the equipment module 52 has been correctly positioned in front of the mission bay, the wheel arrangements 50 lowers the frame onto the ground surface, such that the lift 10 is kept stationary.

Figure 8:
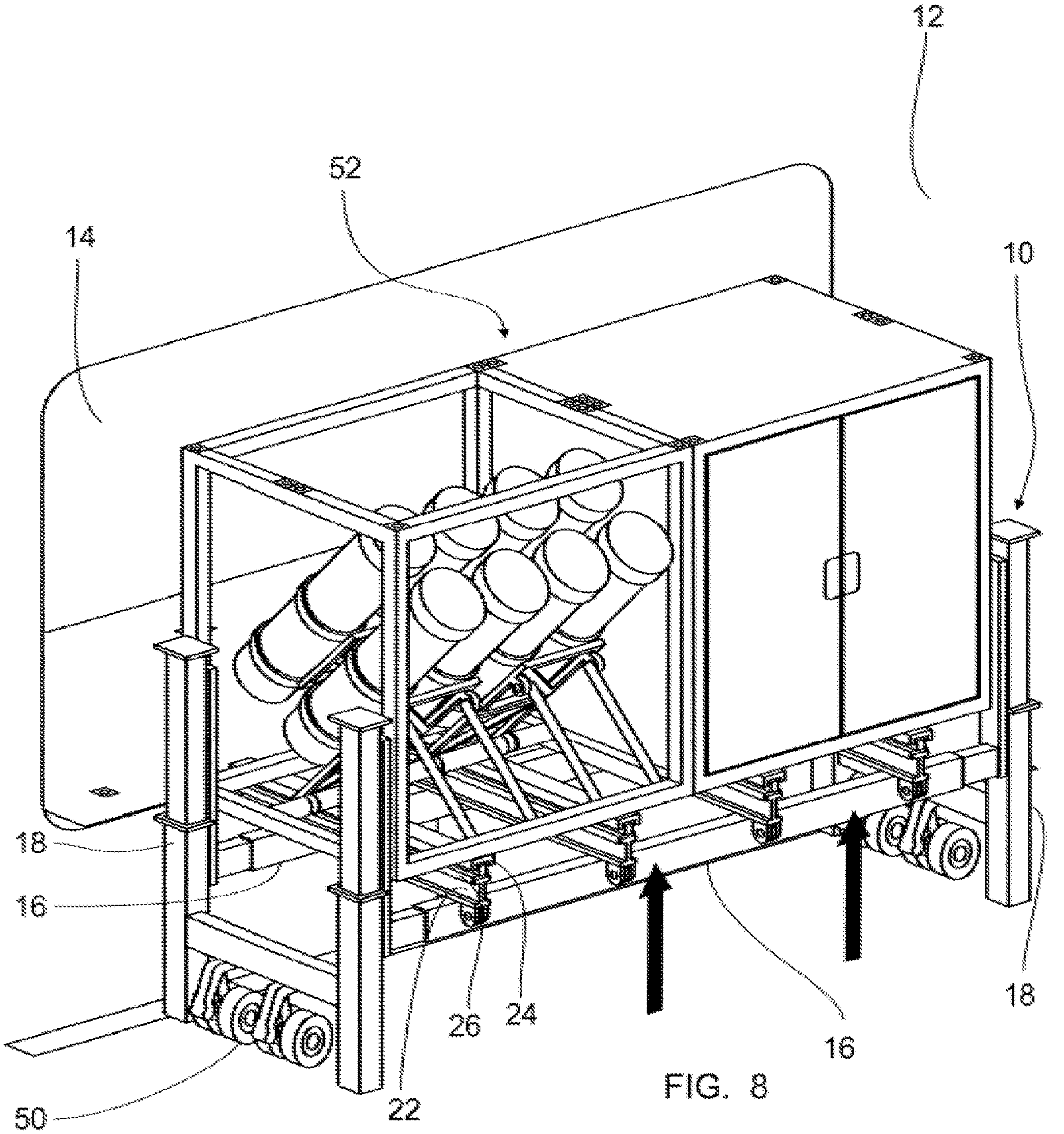
FIG. 8 is a perspective view of the lift with an equipment module being raised.

FIG. 8 is a perspective view of the lift 10 with an equipment module 52 being raised. The equipment module 52, which is maneuvered into the correct position in front of the mission bay 14 is then raised by the loading towers 18 in a vertical direction, to a specific position front of the mission bay. The control unit is able, via the registered reference marker, to determine the specific vertical position, to which the equipment module 52 must be lifted.

Figure 9A:
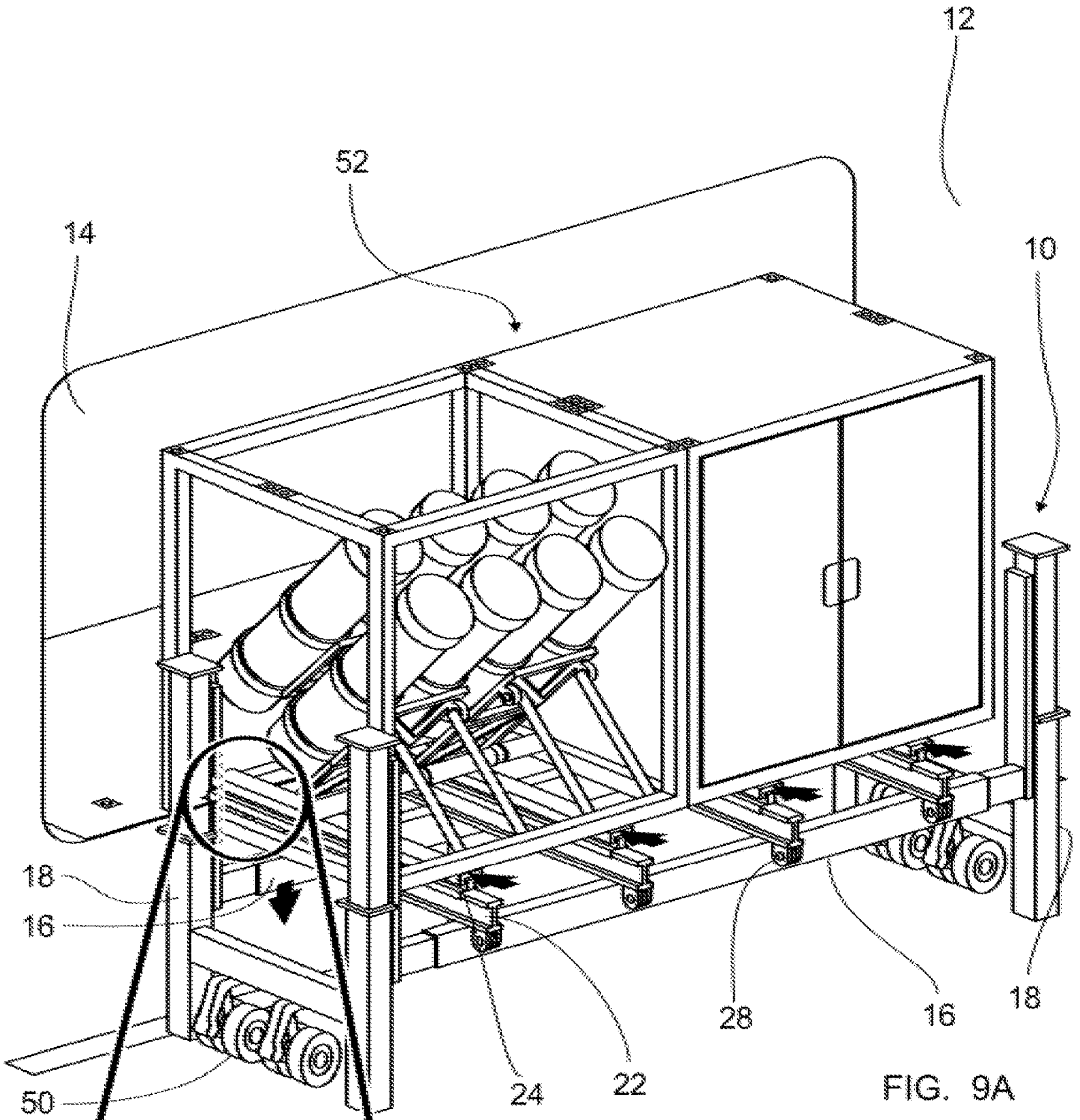
FIG. 9A is a perspective view of the lift with an equipment module being loaded sideways.
Figure 9B:
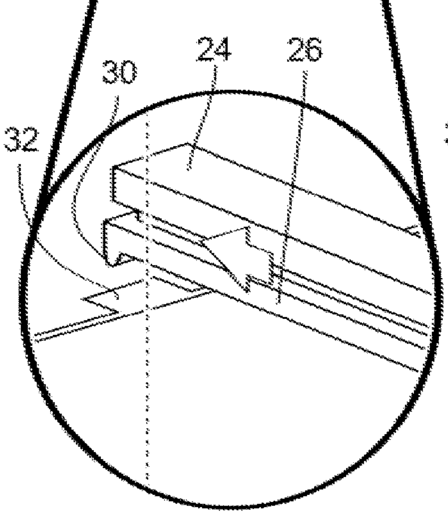
FIG. 9B-9C show perspective views of the interconnection between the hull and a conveying beam.
Figure 9C:
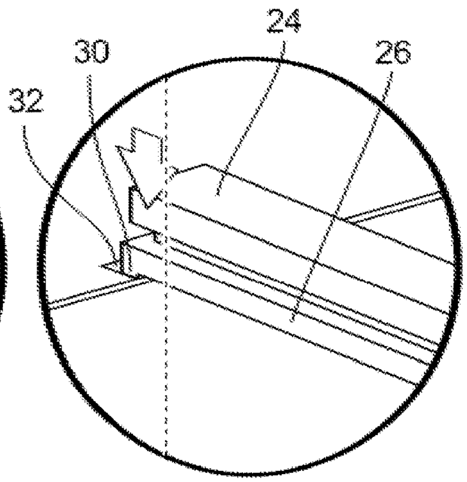

FIG. 9A-9C are perspective views of the lift 10 with an equipment module 52 being loaded sideways and the interconnection between the hull 12 and the conveying beam 20. The loading towers 18 have raised the base frame 16, the conveying beams 20 and the equipment module 52 into a correct specific vertical position in relation to the mission bay 14, such that the conveying beams 20 can be extended into the mission bay 14 in a correct position thereof. As can be seen in FIGS. 9B and 9C, the mission bay comprises a number of openings 32 which corresponds to the number of conveying beams 20, and for interconnection with a connection element (30) arranged in the third beam elements 26. The control unit comprises, from the sensed reference marker, information on the distance to the opening, such that the third beam element 26 can be extended into a position where the connection element 30 is approximate above the opening 32. Once the connection element 30 is located above the opening 32, the connection element is lowered into engagement with the opening 32, whereby the conveying beams are secured against horizontal movement in relation to the mission bay 14. This is particularly important to avoid any misalignment of the equipment module 52 in relation to the footprint. The connection elements 30 are lowered into engagement with the openings 32, by the base frame 16 being lowered. In a preferred embodiment, only the proximal beam of the base frame 16 is lowered, as only the two proximal loading towers are lowered.

Figure 10:
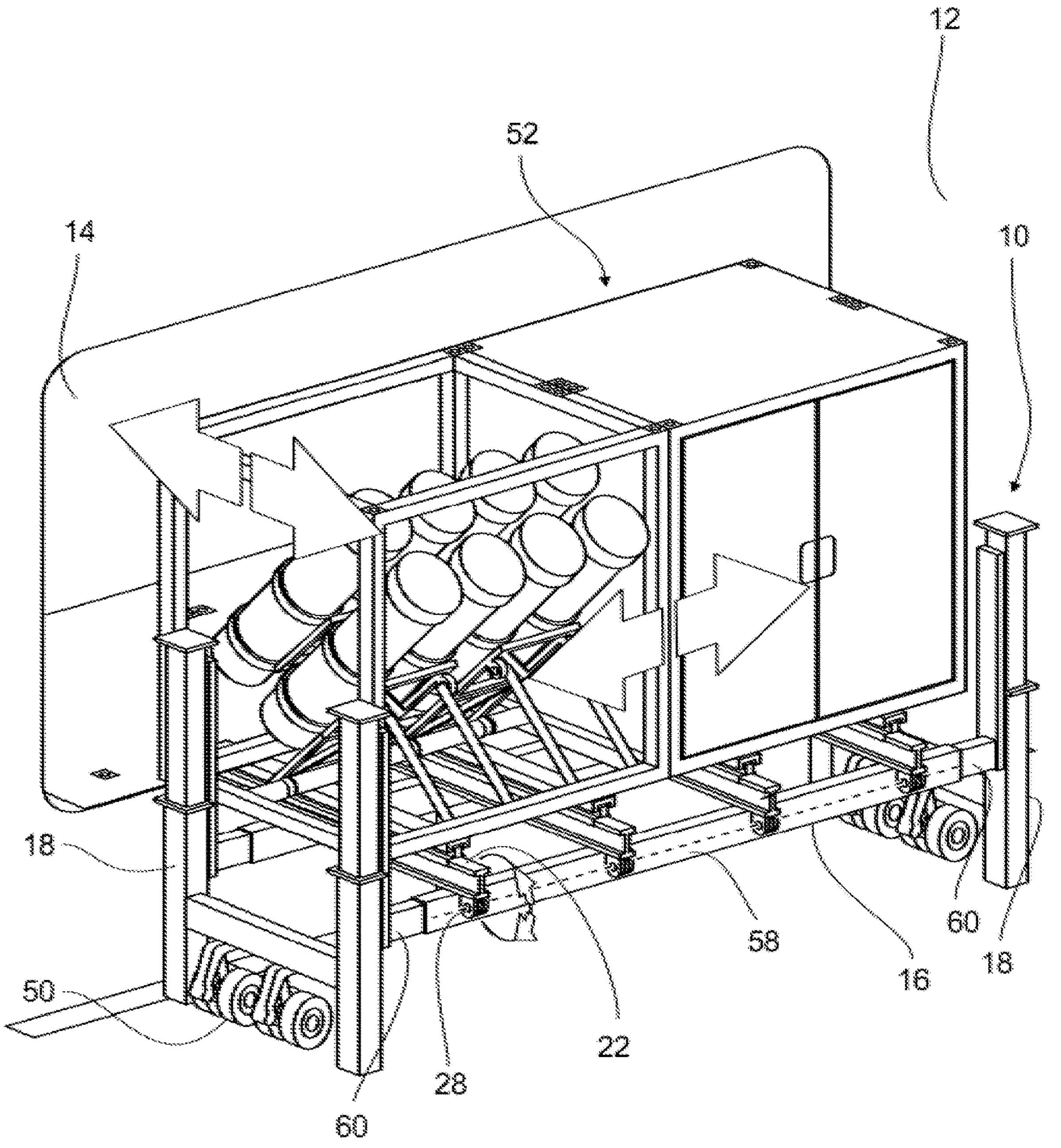
FIG. 10 is a perspective view of the lift with an equipment module compensating vessel movement.

FIG. 10 is a perspective view of the lift 10 with an equipment module 52 compensating vessel movement.

When loading an equipment module 52 into a mission bay 14, it is extremely important that the lift 10 is constructed to compensate for any movement of the sea vessel due to currents or wave motion. If the lift 10 is not able to compensate for the movement, the lift 10 may, due to the involved extreme forces, get detached from the vessel with the possible consequence of equipment destruction or personal injury.

In the illustrated figure, the connection elements 30 are lowered into engagement with the openings 32, by lowering the proximal part of the base frame 16.

Hereby is created a distance between the proximal part of the base frame 16 and the conveying beams 20. The conveying beams 20 are further, at distal ends thereof, connected to the distal part of the base frame 16 via a hinge 28, such that the conveying beams can rotate around an axis perpendicular to the longitudinal direction of the conveying beams, as shown by the circumferential arrow at (28). The conveying beams 20 are hereby vertical displaceable in relation to the proximal end of the base frame (16), to compensate for any tilting rotation of the sea vessel, due to any wave motion.

In order for the lift to compensate for sideways movement of the hull 12, the conveying beams 20 comprise a drive mechanism (not shown), such as hydraulic pistons, for displacing the second 24 and third beam elements 26. When the connection elements 30 are interconnected with the openings 32, the drive mechanism between the first beam element 22, and the third beam element 26 is arranged, preferable by the control unit, in a passive state, such that the first beam element 22 and the third beam element 26 may displace freely in relation to each other. The lift 10 is hereby able to compensate for any sideways movement of the sea vessel as shown by the arrows perpendicular to the hull.

In order for the lift 10 to be able to compensate for any movement of the sea vessel in a direction perpendicular to the conveying beams 20, the lift 10 is arranged with a displaceable base frame 16, having a middle part 58 which is displaceable towards either end of the lift 10, via the extendable projecting elements 60, such that the conveying beams 20 connected to the middle part 58 may be displaced towards either end on the lift 10.

The displacement of the middle part 58 of the base frame 16, thus compensates for the displacement of the sea vessel, such that the conveying beams 20 are maintained stationary with respect to the mission bay, as illustrated by the arrows parallel with the hull 12.

The displacement of the middle part 58 of the base frame 16 is preferably performed by the control system and the HPU.

Figure 11:
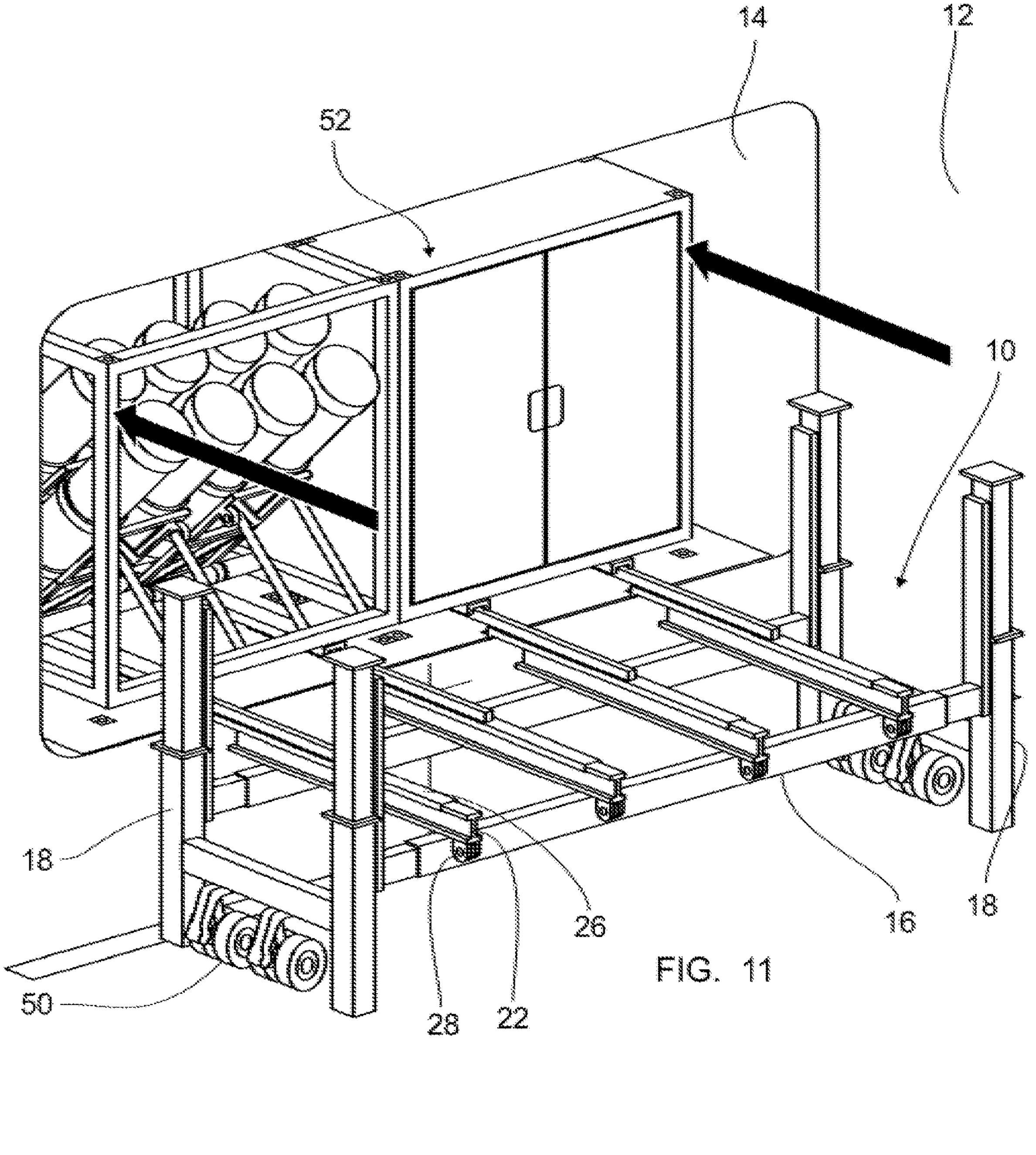
FIG. 11 is a perspective view of the lift with an equipment module being loaded into the mission bay.

FIG. 11 is a perspective view of the lift 10 with an equipment module 52 being loaded into the mission bay 14.

The equipment module 52 is conveyed by the second beam elements 24 into the mission bay 14. The control system operates the conveying, and comprises information, preferably from the sensed reference marker, on the desired depth into the mission bay 14, to which the equipment module is to be conveyed. The correct depth is determined by the location of the footprint 44 within the mission bay 14.

FIG. 12A-12E show perspective views of the equipment module being connected to the mission bay.

Once the equipment module 52 has assumed the correct position within the mission bay 14, the footprint 44 comprises a number of lifting/connecting elements 34 which corresponds to a number of cooperating elements on the module 52. The lifting/connecting elements 34 are operated automatically by the control unit, and the cooperating elements may be arranged as standard ISO container corners 56.

The lifting/connecting elements 34 are arranged with an upper interconnection part, functioning as a locking element 36, having dimensions and a function as a standard twist lock.

The lifting/connecting elements 34 are automatically vertical displaceable installed within the footprint 44, and preferable integrated into the mission bay floor.

The lifting/connecting elements 34 are arranged in a retracted position, when the equipment module 52 is being loaded, as shown in FIG. 12B, and when the equipment module 52 has been loaded within the mission bay 14, the lifting/connecting elements 34 assume a projected position, as shown in FIG. 12C, where the locking element 36 projects into the cooperating elements 56 of the module 52, and assumes a locked position as shown in FIG. 12D.

When the equipment module 52 has been lifted into the mission bay 14, the conveying beams 20, which support the equipment module 52 need to be retracted out of the mission bay 14. For that purpose, the lifting/connecting elements 34 lift the equipment module 52 in relation to the conveying beams 20, such that the conveying beams 20 can be retracted. The lifting/connecting elements 34 are preferably hydraulic driven, functioning as hydraulic jacks, and comprise an upper abutment/lifting surface 62 arranged for lifting the equipment module 52.

The lifting/connecting elements 34, are further displaced in a vertical direction, as illustrated in FIG. 12E, whereby the equipment module is lifted free from the conveying beams 20.

FIG. 13 is a perspective view of the conveying beams 20 being retracted.

After the lifting/connecting elements 34 have lifted the equipment module free from the conveying beams 20, the loading towers 18 lift the conveying beams 20 in a vertical direction, as shown by the vertical arrows, such that the connection elements 30 disengage the openings 32. The drive mechanisms between the first beam elements 22 and the third beam elements 26, and the drive mechanisms between the second beam elements 24 and the third beam elements 26 are operated, such that the conveying beams 20 are conveyed out of the mission bay, as illustrated by the horizontal arrows.

FIG. 14 is a perspective view of the loaded equipment module 52 and the lift 10. The figure shows the final step in the loading of the equipment module 52 into the mission bay 14. After the conveying beams 20 are conveyed out of the mission bay 14, the equipment module 52 is lowered by the lifting/connecting elements 34 onto the footprint 44 of the mission bay 14, and the lift 10 is maneuvered away from the sea vessel.

LIST OF REFERENCE NUMBERS

10 Lift
12 Hull
14 Mission bay
16 Base frame
18 Loading tower
20 Conveying beam
22 First beam element
24 Second beam element
26 Third beam element
28 Hinge
30 Connection element
32 Opening
34 lifting/connecting element
36 Locking element
38 Distance sensor
40 Reference sensor
42 Reference marker
44 Footprint
46 Wheel
48 Suspension arrangement
50 Wheel arrangement
52 Equipment module
54 Gap
56 Module corner
58 Middle part
60 Extendable projecting elements
62 Abutment/lifting surface

The invention claimed is:

1. A lift for sideways loading of equipment modules, or cargo containers, onto a mounting surface of a sea vessel, said equipment modules having sizes substantial equal to, or exceeding dimensions of standard shipping containers, said lift comprising:

a frame for supporting said equipment modules or cargo containers, said frame comprises:

a number of conveying beams for conveying said equipment module or cargo container in a sideways direction in relation to said frame; and means for lifting said conveying beams in a vertical direction, wherein said frame comprises a horizontally expandable and/or displaceable base frame, and wherein said conveying beams comprise a first beam element connected to said base frame, and a second beam element arranged substantially horizontally displaceable in relation to said base frame, said second beam is arranged longitudinally displaceable in relation to the first beam element.

2. A lift according to claim 1, wherein said number of conveying beams being connected to said base frame such that said lift may accommodate modules or containers of different sizes.

3. A lift according to claim 1, wherein said conveying beams comprises a third beam element arranged between said first and second beam element and arranged substantially horizontally displaceable in relation to said base frame.

4. A lift according to claim 3, wherein said third beam element, at an outer end thereof, comprises a connection element for interconnection with a part of said sea vessel.

5. A lift according to claim 4, wherein the part of the sea vessel comprises an opening.

6. A lift according to claim 1, wherein the mounting surface of a sea vessel comprises a ship or a submarine.

7. A lift according to claim 1, wherein the dimensions of the standard shipping containers are 20 foot or 40 foot containers.

8. A method for sideways loading of equipment modules or cargo containers onto a mounting surface of a sea vessel, said equipment modules having sizes substantial equal to, or exceeding dimensions of standard shipping containers, said method comprising the following steps:

providing a lift comprising:

a frame for supporting said equipment modules or cargo containers, said frame comprises:

a number of conveying beams for conveying said equipment module or cargo container in a sideways direction in relation to said frame; and means for lifting said conveying beams in a vertical direction, wherein said frame comprises a horizontally expandable and/or displaceable base frame, and wherein said conveying beams comprise a first beam element connected to said base frame, and a second beam element arranged substantially horizontally displaceable in relation to said base frame, said second beam is arranged longitudinally displaceable in relation to the first beam element;

arranging an equipment module or cargo container onto said lift, maneuvering said lift on a ground surface into a position substantial parallel with a hull of said sea vessel at a specific location, raising said equipment module or cargo container by said lift in a vertical direction to a specific vertical position in relation to a mission bay in said hull, conveying said equipment module or cargo container sideways into said mission bay, by said conveying beams, connecting said equipment module or cargo container to an anchoring point within said mission bay, retracting said conveying beams out of said mission bay.

9. The method according to claim 8, wherein the step of arranging an equipment module or cargo container onto said lift comprises expanding said frame in a horizontal direction according to a horizontal dimension of said equipment module or cargo container and lowering said equipment module or cargo container onto said conveying beams.

10. The method according to claim 9, wherein the step of expanding said frame comprises using a crane.

11. The method according to claim 8, wherein said lift comprises a number of wheels and said step of maneuvering said lift comprises adjusting said wheels around an axis being substantially perpendicular to said ground surface such that the lift may maneuver across the ground in any direction.

12. The method according to claim 8, wherein said step of maneuvering said lift comprises adjusting said position in relation to a reference marker by use of a sensor or by sensing a distance between the lift and the hull by a distance sensor.

13. The method according to claim 12, wherein the sensor comprises a reference camera arranged on said lift.

14. The method according to claim 8, wherein said step of raising said equipment module or cargo container by said lift in a vertical direction, to a specific vertical position in relation to a mission bay in said hull comprises controlling said raising of said equipment module or cargo container in relation to a reference marker by a control unit and a sensor.

15. The method according to claim 8, wherein said step of conveying said equipment module or cargo container sideways into said mission bay, by said conveying beams, comprising the step of displacing said conveying beams in a longitudinal direction thereof sideways towards said hull, and into engagement with said vessel, such that said conveying beams interconnect therewith.

16. The method according to claim 15, wherein said step of conveying said equipment module or cargo container sideways into said mission bay, by said conveying beams, further comprising:

said conveying beams having a drive mechanism for performing said displacement, said drive mechanism, when said conveying beams are interconnected with said vessel, having a passive state, such that said displacement of said conveying beams is a result of any sideways movement of said sea vessel, said conveying beams, at said ends closest to said hull, being vertically displaceable in relation to a base frame, such that said ends can move in a vertical direction as a result of any tilting rotation of said sea vessel, and said conveying beams being displaceable in a direction perpendicular to a longitudinal direction of said conveying beams by displacing said base frame in a horizontal direction as a result of any longitudinal movement of said vessel.

17. The method according to claim 8, wherein said step of connecting said equipment module or cargo container to an anchoring point within said mission bay further comprises the step of locking said equipment module or cargo container to a connecting element and lifting said equipment module or cargo container by a lifting element, in a vertical direction in relation to said conveying beams.

18. The method according to claim 17, wherein said connecting element and said lifting element are integrated.

19. The method according to claim 8, wherein the step of retracting said conveying beams out of said mission bay comprises the step of raising said conveying beams a predetermined vertical distance before being retracted sideways out of said mission bay.

* * * * *